(12) United States Patent
Hu et al.

(10) Patent No.: US 11,847,530 B1
(45) Date of Patent: Dec. 19, 2023

(54) FREQUENCY MODULATION DYNAMIC MODELING METHOD AND DEVICE FOR WIND FARM, AND ELECTRONIC DEVICE

(71) Applicant: North China Electric Power University, Beijing (CN)

(72) Inventors: Yang Hu, Beijing (CN); Fang Fang, Beijing (CN); Xinran Yao, Beijing (CN); Ziqiu Song, Beijing (CN); Jizhen Liu, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/199,156

(22) Filed: May 18, 2023

(30) Foreign Application Priority Data

Nov. 17, 2022 (CN) .......................... 202211437254.0

(51) Int. Cl.
  *G06N 3/08* (2023.01)
  *G06N 3/0442* (2023.01)

(52) U.S. Cl.
  CPC ............. *G06N 3/08* (2013.01); *G06N 3/0442* (2023.01)

(58) Field of Classification Search
  CPC ............................... G06N 3/08; G06N 3/0442
  USPC .................................................... 706/25
  See application file for complete search history.

(56) References Cited

U.S. PATENT DOCUMENTS

| | | | |
|---|---|---|---|
| 10,181,101 B2 * | 1/2019 | Zhang | F03D 7/048 |
| 10,288,043 B2 * | 5/2019 | Yu | G06N 20/00 |
| 11,002,249 B2 * | 5/2021 | Yu | F03D 7/0284 |
| 2022/0195986 A1 * | 6/2022 | Wu | F03D 9/25 |
| 2022/0243700 A1 * | 8/2022 | Grunnet | F03D 7/0224 |

FOREIGN PATENT DOCUMENTS

| | | |
|---|---|---|
| CN | 113193556 A | 7/2021 |
| CN | 114298136 A | 4/2022 |
| CN | 114583767 A | 6/2022 |
| LU | 500788 | 1/2022 |

\* cited by examiner

*Primary Examiner* — Charlotte M Baker
(74) *Attorney, Agent, or Firm* — MUNCY, GEISSLER, OLDS & LOWE, P.C.

(57) ABSTRACT

The present invention provides a frequency modulation dynamic modeling method and device for a wind farm, and an electronic device. The method includes: acquiring first frequency modulation data measured at a grid-connected point of the wind farm under a plurality of preset working conditions; establishing a state space model corresponding to each of the plurality of working conditions according to the first frequency modulation data; measuring the nonlinearity between the state space models corresponding to each two of the plurality of working conditions by using a gap measurement method; combining the first frequency modulation data according to the nonlinearity to obtain second frequency modulation data; and training a preset initial LSTM neural network according to the second frequency modulation data until a preset training requirement is met, and obtaining a trained frequency modulation dynamic model of the wind farm.

6 Claims, 3 Drawing Sheets

FREQUENCY MODULATION DYNAMIC MODELING METHOD AND DEVICE FOR WIND FARM, AND ELECTRONIC DEVICE

BACKGROUND OF THE INVENTION

1. Field of the Invention

The present invention relates to the technical field of intelligent identification and dynamic modeling for frequency modulation working conditions of wind farms, in particular to a frequency modulation dynamic modeling method and device for a wind farm, and an electronic device.

2. Description of Related Art

At present, wind farm-level modeling can be obtained from the aggregation of active responses of wind turbines in the field, or can be directly equivalent modeling. On the basis of establishing a single-unit dynamic frequency modulation linearization model, some scholars clustered similar wind turbines and established a frequency modulation dynamic equivalent model of the wind farm. Researchers established a transient response model of wind turbines, carried out equivalent clustering according to the similarity of wind speeds, and proposed an equivalent method for the wind farm based on active power response. However, the geographical location, weather factors, etc. of the wind farm are relatively complex, and it is difficult to characterize the actual characteristics of the wind farm only based on wind speeds. A researcher added clustering to wind direction while analyzing the similarity of wind speeds, and determined characteristic wind turbines through correlation analysis to characterize output characteristics of the wind farm. However, it is only suitable for short-term output by considering the characteristic wind turbines of wind speed and direction to characterize the entire wind farm without considering the weather factors. Actual wind farms are affected by factors such as a large number of scattered units, complex terrain, and variable climate, so the characteristics of wind farms represented by wind turbines will be limited by various conditions.

According to the understanding of the system mechanism, lumped modeling methods of the grid-connected point data of the wind farm can be divided into three types: black box, gray box and white box. Most of the dynamic mechanisms of wind farms and wind turbines are known. In the lumped modeling process, the complex mechanism controlled process can be ignored, and the relationship between input and output can be directly considered, so that a black box model can be used. In some methods, a small-signal incremental method is used to construct a transfer function model of the system to describe primary frequency modulation response characteristics of wind turbines. However, the transfer function model itself is a linear model, while the frequency regulation problem of the wind farm involves many factors such as operating characteristics, wind speeds, and initial working conditions when the frequency changes of many wind turbines, which is essentially a nonlinear model. There is still a lack of convincing arguments on whether linear models such as transfer functions have high precision in modeling.

Overall, the existing frequency modulation dynamic modeling methods of wind farms have the disadvantages of high modeling difficulty and the difficulty in guaranteeing model accuracy.

SUMMARY OF THE INVENTION

The object of the present invention is to provide a frequency modulation dynamic modeling method and device for a wind farm, and an electronic device, so as to reduce the difficulty in frequency modulation dynamic modeling of the wind farm, and guarantee the model accuracy.

In a first aspect, provided in the embodiments of the present invention is a frequency modulation dynamic modeling method for a wind farm, including: acquiring first frequency modulation data measured at a grid-connected point of the wind farm under a plurality of preset working conditions; constructing a state space model corresponding to each of the plurality of working conditions according to the first frequency modulation data; measuring the nonlinearity between the state space models corresponding to each two of the plurality of working conditions by using a gap measurement method; combining the first frequency modulation data according to the nonlinearity to obtain second frequency modulation data; and training a preset initial LSTM neural network according to the second frequency modulation data until a preset training requirement is met, and obtaining a trained frequency modulation dynamic model of the wind farm.

In combination with the first aspect, provided in the embodiments of the present invention is a first possible implementation mode of the first aspect, where the step of training a preset initial LSTM neural network according to the second frequency modulation data until a preset training requirement is met, and obtaining a trained frequency modulation dynamic model of the wind farm includes: constructing a regression vector according to a primary frequency modulation principle of wind power; determining a delay order of the LSTM neural network on the basis of the Akaike information criterion; and according to the delay order, training the initial LSTM neural network by taking the regression vector as an input and the corresponding output power variation of the wind farm in the second frequency modulation data as an output until a preset training requirement is met, and obtaining the trained frequency modulation dynamic model of the wind farm.

In combination with the first possible implementation mode of the first aspect, provided in the embodiments of the present invention is a second possible implementation mode of the first aspect, where the step of determining a delay order of the LSTM neural network on the basis of the Akaike information criterion includes: determining a delay order of the LSTM neural network on the basis of the following formula:

$$AIC = N*\log\left(\det\left(\frac{1}{N}\sum_{1}^{N}\varepsilon(t,\hat{\theta}_N)(\varepsilon(t,\hat{\theta}_N))^T\right)\right) + 2n_p + N*(n_y*(\log(2\pi)+1)),$$

where AIC represents the value of the Akaike information criterion, $\varepsilon(t)$ represents a preset prediction error vector, $\hat{\theta}_N$ represents preset estimation parameters, N represents the number of sub-data in the second frequency modulation data, $n_p$ is the number of estimation parameters, and $n_y$ is the number of data output by the state space models.

In combination with the first possible implementation mode of the first aspect, provided in the embodiments of the present invention is a third possible implementation mode of the first aspect, where the step of constructing a regression vector according to a primary frequency modulation principle of wind power includes: constructing a regression vector according to the following formula:

$$y(t)=[\Delta f(t-1), \Delta f(t-2), \ldots, \Delta f(t-n_\alpha), \Delta P(t-1), \Delta P(t-2), \ldots, \Delta P(t-n_b)],$$

where $n_\alpha$ and $n_b$ respectively represent the delay orders of the frequency modulation dynamic model of the wind farm, y(t) represents the regression vector equation, $\Delta f(t-1)$ represents the frequency deviation at time t−1 in the second frequency modulation data, $\Delta f(t-2)$ represents the frequency deviation at time t−2 in the second frequency modulation data, $\Delta f(t-n_\alpha)$ represents the frequency deviation at time t−$n_\alpha$ in the second frequency modulation data, $\Delta P(t-1)$ represents the power variation at time t−1 in the second frequency modulation data, $\Delta P(t-2)$ represents the power variation at time t−2 in the second frequency modulation data, and $\Delta P(t-n_b)$ represents the power variation at time t−$n_b$ in the second frequency modulation data.

In combination with the first aspect, provided in the embodiments of the present invention is a fourth possible implementation mode of the first aspect, where the step of constructing a state space model corresponding to each of the plurality of working conditions according to the first frequency modulation data includes: calculating a state space matrix corresponding to the first frequency modulation data on the basis of an N4SID subspace identification method; and constructing a state space model corresponding to each of the plurality of working conditions according to the state space matrix.

In combination with the first aspect, provided in the embodiments of the present invention is a fifth possible implementation mode of the first aspect, where after the step of training a preset initial LSTM neural network according to the second frequency modulation data until a preset training requirement is met, and obtaining a trained frequency modulation dynamic model of the wind farm, the method also includes: calculating a mean square error and an absolute percentage error of the LSTM neural network after each training; and when both the mean square error and the absolute percentage error meet preset error threshold requirements, confirming that the training meets preset training requirements, and obtaining the trained frequency modulation dynamic model of the wind farm.

In combination with the first aspect, provided in the embodiments of the present invention is a sixth possible implementation mode of the first aspect, where the step of combining the first frequency modulation data according to the nonlinearity to obtain second frequency modulation data includes: dividing the plurality of working conditions into a plurality of working condition domains according to the nonlinearity; and combining the first frequency modulation data corresponding to each working condition domain to obtain the second frequency modulation data.

In combination with the first aspect, provided in the embodiments of the present invention is a seventh possible implementation mode of the first aspect, where the step of acquiring first frequency modulation data of frequency modulation response characteristics of the wind farm under a plurality of preset working conditions includes: acquiring data measured at a grid-connected point of frequency modulation response characteristics of the wind farm under the plurality of preset working conditions; and processing the data measured at the grid-connected point according to the preset conditions to obtain the first frequency modulation data.

In a second aspect, provided in the embodiments of the present invention is a frequency modulation dynamic modeling device for a wind farm, including: a data acquisition module, configured to acquire first frequency modulation data measured at a grid-connected point of the wind farm under a plurality of preset working conditions; a space model construction module, configured to construct a state space model corresponding to each of the plurality of working conditions according to the first frequency modulation data; a nonlinearity determination module, configured to measure the nonlinearity between the state space models corresponding to each two of the plurality of working conditions by using a gap measurement method; a working condition domain frequency modulation data determination module, configured to combine the first frequency modulation data according to the nonlinearity to obtain second frequency modulation data; and a model training module, configured to train a preset initial LSTM neural network according to the second frequency modulation data until a preset training requirement is met, and obtain the trained frequency modulation dynamic model of the wind farm.

In a third aspect, provided in the embodiments of the present invention is an electronic device, including a processor and a memory, where the memory stores computer-executable instructions capable of being executed by the processor, and the processor executes the computer-executable instructions to implement the frequency modulation dynamic modeling method for the wind farm according to any one of the first aspect to the seventh possible implementation mode of the first aspect.

The embodiments of the present invention bring the following beneficial effects.

Provided in the embodiments of the present invention are frequency modulation dynamic modeling method and device for a wind farm, and an electronic device. The method includes: acquiring first frequency modulation data measured at a grid-connected point of the wind farm under a plurality of preset working conditions; constructing a state space model corresponding to each of the plurality of working conditions according to the first frequency modulation data; measuring the nonlinearity between the state space models corresponding to each two of the plurality of working conditions by using a gap measurement method; combining the first frequency modulation data according to the nonlinearity to obtain second frequency modulation data; and training a preset initial LSTM neural network according to the second frequency modulation data until a preset training requirement is met, and obtaining a trained frequency modulation dynamic model of the wind farm. By using the method, the difficulty in frequency modulation dynamic modeling of the wind farm can be reduced, and the accuracy of frequency modulation dynamic modeling of the wind farm can be improved.

BRIEF DESCRIPTION OF THE DRAWINGS

In order to more clearly illustrate the specific implementation modes of the present invention or the technical solutions in the prior art, the following will briefly introduce the accompanying drawings that need to be used in the description of the specific implementation modes or prior art. Obviously, the accompanying drawings in the following description are some implementation modes of the present invention, and those of ordinary skilled in the art can also obtain other accompanying drawings based on these accompanying drawings without creative work.

Reference numerals: 31-data acquisition module; 32-space model construction module; 33-nonlinearity determination module; 34-working condition domain frequency modulation data determination module; 35-model training module; 41-memory; 42-processor; 43-bus; and 44-communication interface.

DETAILED DESCRIPTION OF THE PREFERRED EMBODIMENTS

In order to make the purpose, technical solutions and advantages of the embodiment of the present invention clearer, the technical solutions of the present invention will be clearly and completely described below in conjunction with the accompanying drawings. Obviously, the described embodiments are part of the embodiments of the present invention, not all of them. Based on the embodiments of the present invention, all other embodiments obtained by those of ordinary skill in the art without creative efforts fall within the protection scope of the present invention.

At present, according to the understanding of the system mechanism, lumped modeling method for grid-connected point data of a wind farm can be divided into three types: black box, gray box and white box. Most of the dynamic mechanisms of wind farms and wind turbines are known, while in the lumped modeling process, a complex mechanism controlled process can be ignored, and the relationship between input and output can be directly considered, so that a black box model can be used. In some methods, a small-signal incremental method is used to construct a transfer function model of the system to describe primary frequency modulation response characteristics of wind turbines. However, the transfer function model itself is a linear model, while the frequency regulation problem of the wind farm involves many factors such as operating characteristics, wind speeds, and initial working conditions when the frequency changes of many wind turbines, which is essentially a nonlinear model. There is still a lack of convincing arguments on whether linear models such as transfer functions have high precision in modeling.

Based on this, provided in the embodiments of the present invention are frequency modulation dynamic modeling method and device for a wind farm, and an electronic device. By using such technology, the difficulty in frequency modulation dynamic modeling of the wind farm can be reduced, and the accuracy of frequency modulation dynamic modeling of the wind farm can be improved. In order to facilitate the understanding of the embodiments of the present invention, a frequency modulation dynamic modeling method for a wind farm disclosed in the embodiments of the present invention is firstly introduced in detail.

Embodiment 1

Figure 1:
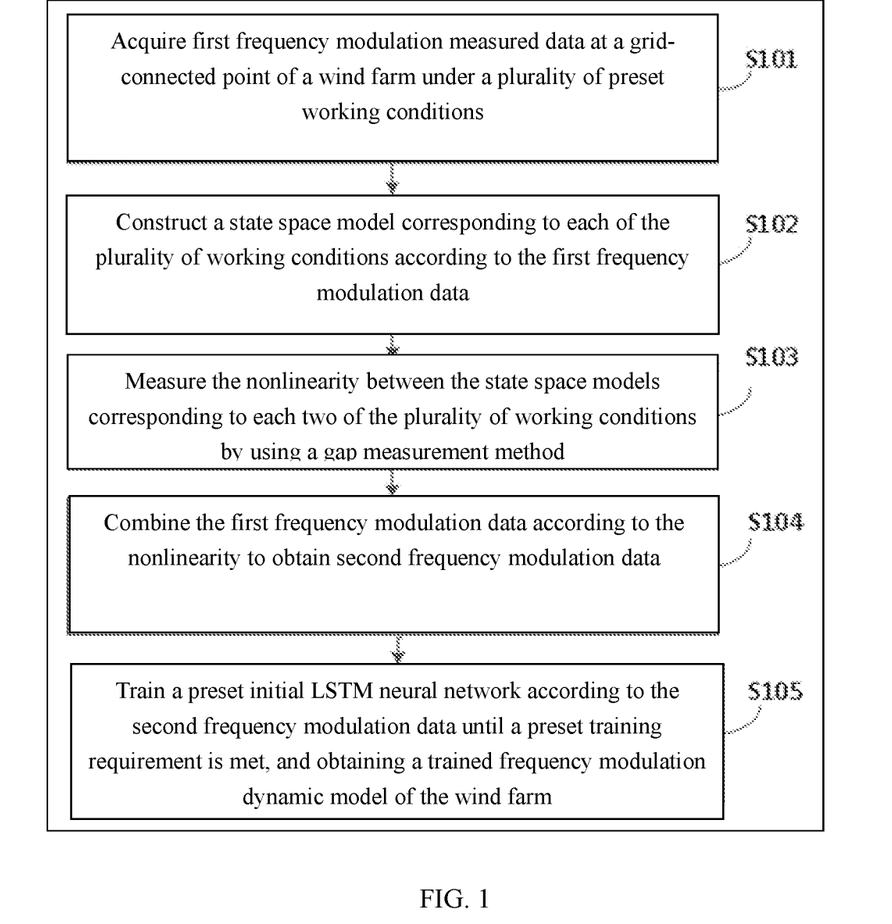
FIG. 1 is a schematic flowchart of a frequency modulation dynamic modeling method for a wind farm provided by an embodiment of the present invention.

FIG. 1 is a schematic flowchart of a frequency modulation dynamic modeling method for a wind farm provided by the embodiments of the present invention. As shown in FIG. 1, the method includes the following steps:

Step S101: first frequency modulation data measured at a wind farm grid-connected point under a plurality of preset working conditions is acquired.

In this embodiment, step S101 includes: firstly, acquiring data measured at a grid-connected point of frequency modulation response characteristics of the wind farm under a plurality of preset working conditions; and processing the data measured at the grid-connected point according to preset conditions to obtain the first frequency modulation data. Here, the preset conditions are generally used to select the first frequency modulation data under typical working conditions.

Step S102: a state space model corresponding to each of the plurality of working conditions is constructed according to the first frequency modulation data.

In this embodiment, step S102 includes: firstly, calculating a state space matrix corresponding to the first frequency modulation data; and constructing a state space model corresponding to each of the plurality of working conditions according to the state space matrix.

Step S103: measuring the nonlinearity between the state space models corresponding to each two of the plurality of working conditions by using a gap measurement method.

In this embodiment, step S103 includes: firstly, measuring a gap measurement value between the state space models corresponding to each two of the plurality of working conditions by using a gap measurement method; and determining the nonlinearity between the state space models according to the gap measurement value.

Step S104: the first frequency modulation data is combined according to the nonlinearity to obtain second frequency modulation data.

In actual operations, the degree of similarity of the working conditions corresponding to the first frequency modulation data can be judged on the basis of the nonlinearity, so that the plurality of working conditions are divided into different working condition domains, and the first frequency modulation data are divided according to corresponding working condition domains to obtain the second frequency modulation data, where the working condition domains are a collection of a group of similar working conditions; and the step of dividing the first frequency modulation data according to corresponding working condition domains to obtain the second frequency modulation data includes: combining the first frequency modulation data according to the working condition domains to obtain second frequency modulation data.

Step S105: a preset initial LSTM neural network is trained according to the second frequency modulation data until a preset training requirement is met, and a trained frequency modulation dynamic model of the wind farm is obtained.

In one of the implementation mode, on the basis of the primary frequency modulation principle of the wind farm, a regression vector is constructed according to the second frequency modulation data, a preset initial LSTM neural network is trained on the basis of the regression vector and the second frequency modulation data until a preset training requirement is met, and a trained frequency modulation dynamic model of the wind farm is obtained.

In one of the implementation modes, the regression vector is taken as an input, and the second frequency modulation data is taken as an output, where the regression vector is divided into a training set and a verification set according to a preset ratio. Step S104 also includes: training a preset initial LSTM neural network according to the training set until a preset training requirement is met, and obtaining an intermediate frequency modulation dynamic model of the wind farm; and training the intermediate frequency modulation dynamic model of the wind farm according to the verification set until a preset verification requirement is met, and obtaining a trained frequency modulation dynamic model of the wind farm.

The present invention provides a frequency modulation dynamic modeling method for a wind farm, including: acquiring first frequency modulation data measured at a grid-connected point of the wind farm under a plurality of preset working conditions; constructing a state space model corresponding to each of the plurality of working conditions according to the first frequency modulation data; measuring the nonlinearity between the state space models corresponding to each two of the plurality of working conditions by using a gap measurement method; combining the first frequency modulation data according to the nonlinearity to obtain second frequency modulation data; and training a preset initial LSTM neural network according to the second frequency modulation data until a preset training requirement is met, and obtaining a trained frequency modulation dynamic model of the wind farm. By using the method, the difficulty in frequency modulation dynamic modeling of the wind farm can be reduced, and the accuracy of frequency modulation dynamic modeling of the wind farm can be improved.

Embodiment 2

Figure 2:
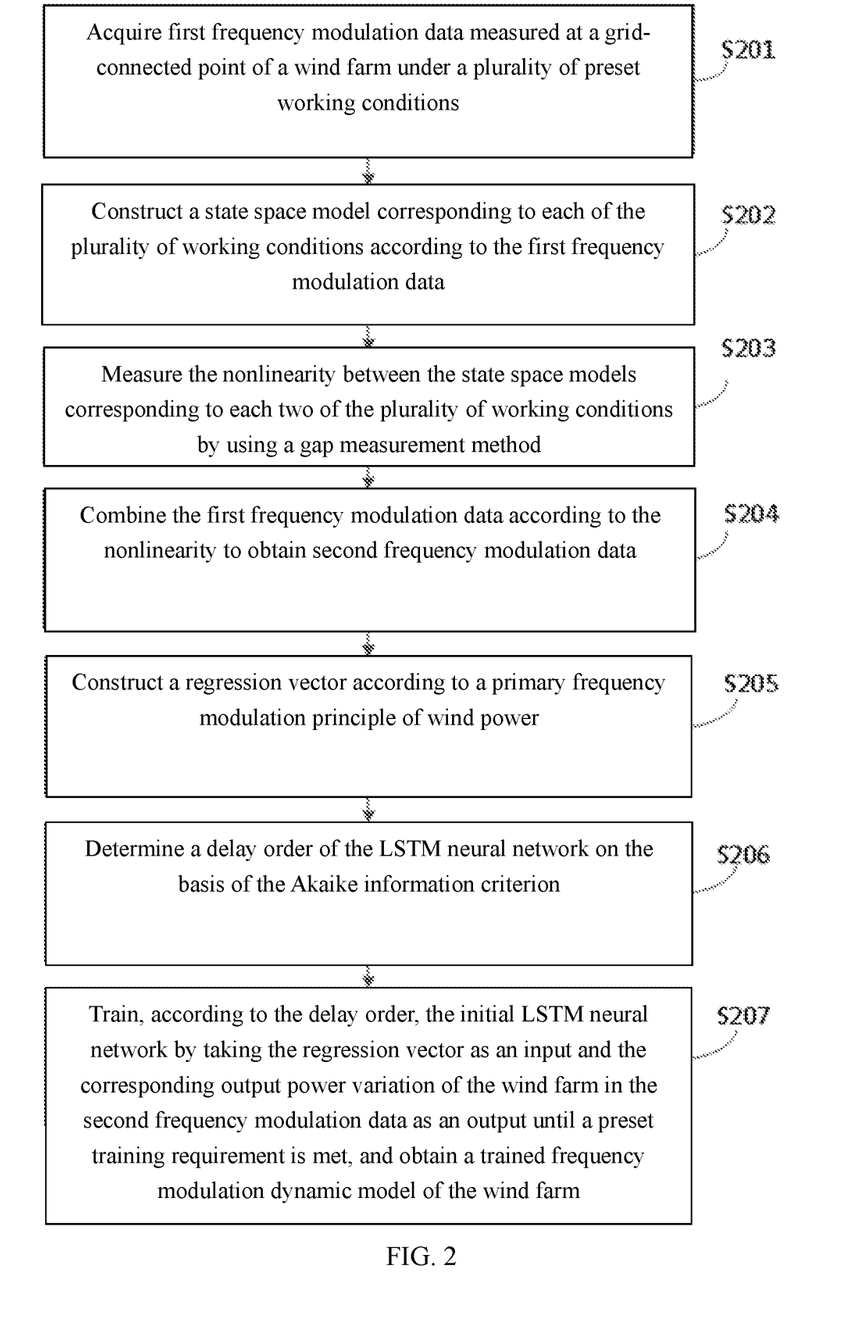
FIG. 2 is a schematic flowchart of another frequency modulation dynamic modeling method for a wind farm provided by the embodiment of the present invention.

On the basis of FIG. 1, the present embodiment also provides another frequency modulation dynamic modeling method for a wind farm. FIG. 2 is a schematic flowchart of another frequency modulation dynamic modeling method for a wind farm provided by the embodiments of the present invention. As shown in FIG. 2, the method includes the following steps:

Step S201: first frequency modulation data measured at a grid-connected point of the wind farm under a plurality of preset working conditions is acquired.

Step S202: a state space model corresponding to each of the plurality of working conditions is constructed according to the first frequency modulation data.

Here, on the basis of an N4SID subspace identification method, a state space matrix corresponding to the first frequency modulation data is first calculated, and then a state space model corresponding to each of the plurality of working conditions is constructed according to the state space matrix.

Further, the input of the state space model is the variation $\Delta f$ of the frequency value, corresponding to the first frequency modulation data, of the wind farm, and the output is the output power variation $\Delta P$ of the wind farm, respectively. The subspace identification model is as follows:

$$Ax(t)+Bu(t)+Ke(t)$$

$$Cx(t)+Du(t)+e(t)$$

where A, B, C, D and K are state space matrices, u(t) is the output, e(t) is the disturbance, and x(t) is the generalized state quantity. By default, all entries of A, B, C and K are parameters that can be freely estimated. For a dynamic system, D is fixed at zero by default, which means that the corresponding frequency modulation system of the wind farm is not fed up; and for a static frequency modulation system of the wind farm, D is an estimable parameter by default.

Step S203: the nonlinearity between the state space models corresponding to each two of the plurality of working conditions is measured by using a gap measurement method.

In this embodiment, a gap measurement value between the state space models corresponding to each two of the plurality of working conditions is measured by using a gap measurement method. Here, the gap measurement value is any value between 0 and 1. If the gap measurement value is close to 0, it means that the characteristics between two linear systems are similar, and the system can be approximated as a wind farm frequency modulation system; and if the gap measurement value is close to 1, it means that the distance between the wind farm frequency modulation systems is relatively long, and the dynamic characteristics between the wind farm frequency modulation systems are quite different. Further, the nonlinearity can be obtained according to the gap measurement value.

Step S204: the first frequency modulation data is combined according to the nonlinearity to obtain second frequency modulation data.

In actual operations, features regarding the distance between linear systems can be measured according to Gap Metric, which thus is used to measure the difference in system dynamic characteristics under different working conditions. In frequency modulation state space modeling, the distance between the state spaces of any two working conditions is calculated, the degree of similarity of models between different working conditions is evaluated, and the working conditions with closer distances are divided into one working condition domain, so that modeling of many and complex working conditions in real scenarios is facilitated.

In one of the implementation modes, step S204 includes: firstly, dividing the plurality of working conditions into a plurality of working condition domains according to the nonlinearity; and combining the first frequency modulation data corresponding to each working condition domain to obtain the second frequency modulation data.

Step S205: a regression vector is constructed according to the principle of primary frequency modulation of wind power.

In this embodiment, the step of constructing a regression vector according to the primary frequency modulation principle of wind power includes: constructing a regression vector according to the following formula:

$$y(t)=[\Delta f(t-1),\Delta f(t-2),\ldots,\Delta f(t-n_\alpha),\Delta P(t-1),\Delta P(t-2),\ldots,\Delta P(t-n_b)],$$

where $n_\alpha$ and $n_b$ respectively represent the delay orders of the wind farm frequency modulation dynamic model, y(t) represents the regression vector equation, $\Delta f(t-1)$ represents the frequency deviation at time t-1 in the second frequency modulation data, $\Delta f(t-2)$ represents the frequency deviation at time t-2 in the second frequency modulation data, $\Delta f(t-n_\alpha)$ represents the frequency deviation at time $t-n_\alpha$ in the second frequency modulation data, $\Delta P(t-1)$ represents the power variation at time t-1 in the second frequency modulation data, $\Delta P(t-2)$ represents the power variation at time t-2 in the second frequency modulation data, and $\Delta P(t-n_b)$ represents the power variation at time $t-n_b$ in the second frequency modulation data.

Here, since the second frequency modulation data is obtained by dividing the first frequency modulation data according to the working condition domains, after step S205, multiple regression vectors are obtained, where each of the regression vectors corresponds to the working condition domains.

Step S206: a delay order of the LSTM neural network is determined on the basis of the Akaike information criterion.

In actual operations, a delay order of the LSTM neural network is determined on the basis of the following formula:

$$AIC = N*\log\left(\det\left(\frac{1}{N}\sum_{1}^{N}\varepsilon(t,\hat{\theta}_N)(\varepsilon(t,\hat{\theta}_N))^T\right)\right) + 2n_p + N*(n_\gamma*(\log(2\pi)+1))$$

where AIC represents the value of the Akaike information criterion, $\varepsilon(t)$ represents a preset prediction error vector, $\hat{\theta}_N$ represents preset estimation parameters, N represents the number of sub-data in the second frequency modulation data, $n_p$ is the number of estimation parameters, and $n_y$ is the number of data output by the state space models.

Step S207: according to the delay order, the initial LSTM neural network is trained by taking the regression vector as an input and the corresponding output power variation of the wind farm in the second frequency modulation data as an output, until a preset training requirement is met, and a trained frequency modulation dynamic model of the wind farm is obtained.

Here, the trained frequency modulation dynamic model of the wind farm is obtained by taking the regression vector corresponding to one of the working condition domains as an input each time. If there are N kinds of working conditions in the working condition domains, N trained frequency modulation dynamic models of the wind farm will be obtained in the end.

In one of the implementation modes, after step S207, the method also includes: calculating a mean square error and an absolute percentage error of the LSTM neural network after each training; and when both the mean square error and the absolute percentage error meet preset error threshold requirements, confirming that the training meets preset training requirements, and obtaining the trained frequency modulation dynamic model of the wind farm.

Here, there are a plurality of trained frequency modulation dynamic models of the wind farm, and each of the trained frequency modulation dynamic models of the wind farm corresponds to the working condition domains.

In actual operations, in order to evaluate the performance of the frequency modulation dynamic models of the wind farm, the root mean square error and absolute percentage error are defined to measure the accuracy of the frequency modulation dynamic model of the wind farm. The smaller the values of the root mean square error and absolute percentage error, the higher the model accuracy. The accuracy is calculated by the following formula:

$$\sum_{i=1}^{N_I}\left(\frac{\Delta P^*(i)-\Delta P(i)}{\Delta P_{cap}}\right)^2$$

$$MAPE = \frac{1}{N_I}\sum_{i=1}^{N_I}\frac{|\Delta P^*(i)-\Delta P(i)|}{\Delta P(i)}.$$

In the formula, $N_I$ is the sample size of the input frequency modulation dynamic model of the wind farm, $\Delta P_{cap}$ is the rated capacity of the frequency modulation dynamic model of the wind farm, $\Delta P^*(i)$ is the output power value of the i-th frequency modulation dynamic model of the wind farm, and $\Delta P(i)$ is the actual power value corresponding to the i-th working condition domain in the second frequency modulation data.

Further, frequency modulation dynamic models, corresponding to various working condition domains, of the wind farm are obtained through the above steps.

The present invention provides a frequency modulation dynamic modeling method for a wind farm, including: acquiring first frequency modulation data measured at a grid-connected point of the wind farm under a plurality of preset working conditions; constructing a state space model corresponding to each of the plurality of working conditions according to the first frequency modulation data; measuring the nonlinearity between the state space models corresponding to each two of the plurality of working conditions by using a gap measurement method; combining the first frequency modulation data according to the nonlinearity to obtain second frequency modulation data; constructing a regression vector according to a primary frequency modulation principle of wind power; determining a delay order of the LSTM neural network on the basis of the Akaike information criterion; and according to the delay order, training the initial LSTM neural network by taking the regression vector as an input and the corresponding output power variation of the wind farm in the second frequency modulation data as an output until a preset training requirement is met, and obtaining a trained frequency modulation dynamic model of the wind farm. In this method, the initial LSTM neural network is trained by constructing the regression vector on the basis of the primary frequency modulation principle of wind power, so that the accuracy of the frequency modulation dynamic model of the wind farm is further improved.

Embodiment 3

Figure 3:
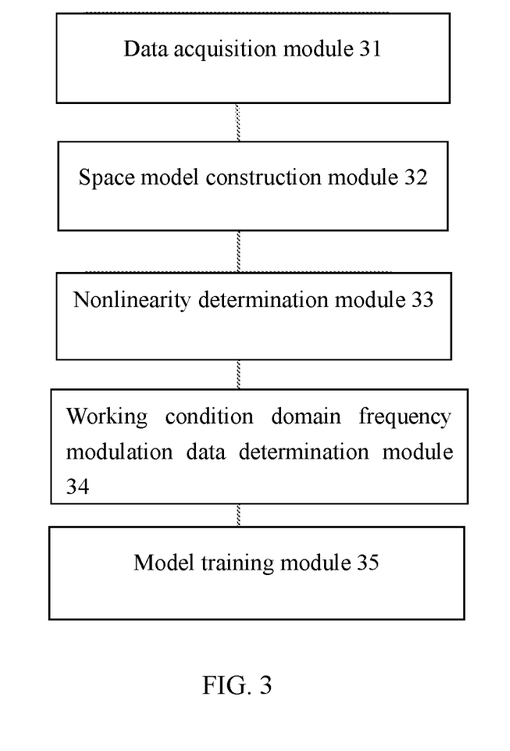
FIG. 3 is a schematic structural diagram of a frequency modulation dynamic modeling device for a wind farm provided by the embodiment of the present invention.

Also provided in the embodiments of the present invention is a frequency modulation dynamic modeling device for a wind farm. FIG. 3 as shown is a schematic structural diagram of a frequency modulation dynamic modeling device for a wind farm provided by the embodiments of the present invention, the device including: a data acquisition module 31, configured to acquire first frequency modulation data measured at a grid-connected point of the wind farm under a plurality of preset working conditions.

A space model construction module 32, configured to construct a state space model corresponding to each of the plurality of working conditions according to the first frequency modulation data.

A nonlinearity determination module 33, configured to measure the nonlinearity between the state space models corresponding to each two of the plurality of working conditions by using a gap measurement method.

A working condition domain frequency modulation data determination module 34, configured to combine the first frequency modulation data according to the nonlinearity to obtain second frequency modulation data.

A model training module 35, configured to train a preset initial LSTM neural network according to the second frequency modulation data until a preset training requirement is met, and obtain a trained frequency modulation dynamic model of the wind farm.

The data acquisition module 31, the space model construction module 32, the nonlinearity determination module 33, the working condition domain frequency modulation data determination module 34, and the model training module 35 are connected in sequence.

In one of the implementation modes, the model training module 35 is also configured to construct a regression vector according to the primary frequency modulation principle of wind power; determine a delay order of the LSTM neural network on the basis of the Akaike information criterion; and according to the delay order, train the initial LSTM neural network by taking the regression vector as an input and the corresponding output power variation of the wind farm in the second frequency modulation data as an output until a preset training requirement is met, and obtain a trained frequency modulation dynamic model of the wind farm.

In one of the implementation modes, the model training module 35 is also configured to determine a delay order of the LSTM neural network on the basis of the following formula:

$$AIC = N * \log\left(\det\left(\frac{1}{N}\sum_{1}^{N}\varepsilon(t,\hat{\theta}_N)(\varepsilon(t,\hat{\theta}_N))^T\right)\right) + 2n_p + N*(n_\gamma*(\log(2\pi)+1))$$

where AIC represents the value of the Akaike information criterion, ε(t) represents a preset prediction error vector, $\hat{\theta}_N$ represents preset estimation parameters, N represents the number of sub-data in the second frequency modulation data, $n_p$ is the number of estimation parameters, and $n_y$ is the number of data output by the state space models.

In one of the implementation modes, the model training module 35 is also configured to construct a regression vector according to the following formula:

$$y(t)=[\Delta f(t-1), \Delta f(t-2), \ldots, \Delta f(t-n_\alpha), \Delta P(t-1), \Delta P(t-2), \ldots, \Delta P(t-n_b)],$$

where $n_\alpha$ and $n_b$ respectively represent the delay orders of the wind farm frequency modulation dynamic model, γ(t) represents the regression vector equation, Δf(t−1) represents the frequency deviation at time t−1 in the second frequency modulation data, Δf(t−2) represents the frequency deviation at time t−2 in the second frequency modulation data, Δf(t−$n_\alpha$) represents the frequency deviation at time t−$n_\alpha$ in the second frequency modulation data, ΔP(t−1) represents the power variation at time t−1 in the second frequency modulation data, ΔP(t−2) represents the power variation at time t−2 in the second frequency modulation data, and ΔP(t−$n_b$) represents the power variation at time t−$n_b$ in the second frequency modulation data.

In one of the implementation modes, the space model building module 32 is also configured to calculate a state space matrix corresponding to the first frequency modulation data on the basis of an N4SID subspace identification method; and construct a state space model corresponding to each of the plurality of working conditions according to the state space matrix.

In one of the implementation modes, the model training module 35 is also configured to calculate a mean square error and an absolute percentage error of the LSTM neural network after each training; and when both the mean square error and the absolute percentage error meet preset error threshold requirements, confirm that the training meets preset training requirements, and obtain a trained frequency modulation dynamic model of the wind farm.

In one of the implementation modes, the nonlinearity determination module 33 is also configured to divide the plurality of working conditions into a plurality of working condition domains according to the nonlinearity; and combine the first frequency modulation data corresponding to each working condition domain to obtain the second frequency modulation data.

In one of the implementation modes, the data acquisition module 31 is also configured to acquire data measured at a grid-connected point of frequency modulation response characteristics of the wind farm under a plurality of preset working conditions; and process the data measured at the grid-connected point according to preset conditions to obtain the first frequency modulation data.

The frequency modulation dynamic modeling device for the wind farm provided in the embodiments of the present invention, having the same technical features as the frequency modulation dynamic modeling method for the wind farm provided in the above embodiments, can thus also solve the same technical problems and achieve the same technical effect. Those skilled in the art can clearly understand that, for the convenience and brevity of the description, the specific working process of the device described above can refer to the corresponding process in the foregoing method embodiments, which will not be repeated here.

Embodiment 4

Provided in the embodiment is an electronic device, including a processor and a memory, where the memory stores computer-executable instructions capable of being executed by the processor, and the processor executes the computer-executable instructions to implement the steps of the frequency modulation dynamic modeling method for the wind farm.

Provided in the embodiment is a computer-readable storage medium, in which a computer program is stored, and when the computer program is executed by the processor, the steps of the frequency modulation dynamic modeling method for a wind farm are implemented.

Figure 4:
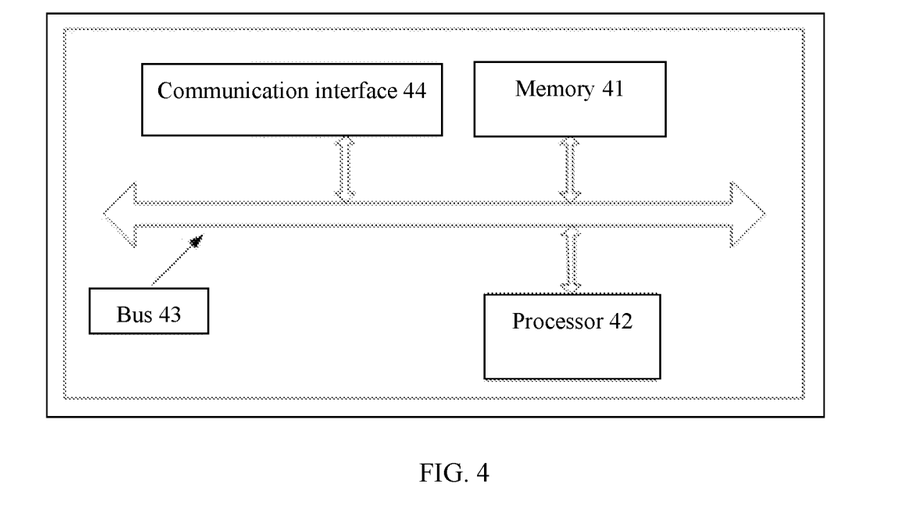
FIG. 4 is a schematic structural diagram of an electronic device provided by the embodiment of the present invention.

Referring to a schematic structural diagram of an electronic device shown in FIG. 4, the electronic device includes: a memory 41 and a processor 42, where the memory 41 stores a computer program that can run on the processor 42, and the processor implements the steps provided by the frequency modulation dynamic modeling method for a wind farm when executing the computer program.

As shown in FIG. 4, the device also includes: a bus 43 and a communication interface 44, where the processor 42, the communication interface 44 and the memory 41 are connected through the bus 43; and the processor 42 is used to execute executable modules, such as a computer program, stored in the memory 41.

The memory 41 may include a high-speed random access memory (RAM, Random Access Memory), and may also include a non-volatile memory (non-volatile memory), such as at least one disk memory. The communication connection between the system network element and at least one other network element is realized through at least one communication interface 44 (which may be wired or wireless), such as Internet, wide area network, local network, metropolitan area network.

The bus 43 may be an ISA bus, a PCI bus or an EISA bus, etc. The bus can be divided into an address bus, a data bus, a control bus, etc. For ease of representation, FIG is represented only by one bidirectional arrow, which however does not mean that there is only one bus or one type of bus.

The memory 41 is used to store a program, and the processor 42 executes the program after an execution instruction is received. Any embodiment of the present invention discloses that the method performed by the frequency modulation dynamic modeling method for the wind farm can be applied to the processor 42, or can be implemented by the processor 42. The processor 42 may be an integrated circuit chip with signal processing capabilities. In the implementation process, each step of the method can be completed by the integrated logic circuit of hardware in the processor 42 or instructions in the form of software. The processor 42 can be a general-purpose processor, including a central processing unit (Central Processing Unit, CPU for short), a network processor (Network Processor, NP for short), etc.; and can also be a digital signal processor (Digital Signal Processing, DSP for short), an application specific integrated circuit (Application Specific Integrated Circuit, ASIC for short), a field-programmable gate array (Field-Programmable Gate Array, FPGA for short) or other programmable logic devices, discrete gate or transistor logic devices, and discrete hardware components. Various methods, steps and logic block diagrams disclosed in the embodiments of the present invention may be implemented or executed. The general-purpose processor may be a microprocessor, or the processor may be any conventional processor, or the like. The steps of the methods disclosed in the embodiments of the present invention may be directly implemented by a hardware decoding processor, or implemented by a combination of hardware and software modules in the decoding processor. The software module can be located in a mature storage medium in the field such as a random access memory, a flash memory, a read-only memory, a programmable read-only memory or an electrically erasable programmable memory and a register. The storage medium is located in the memory 41, the processor 42 reads the information in the memory 41, and the steps of the method are completed in combination with its hardware.

Furthermore, also provided in the embodiments of the present invention is a machine-readable storage medium, which stores machine-executable instructions, and when called and executed by the processor 42, the machine-executable instructions cause the processor 42 to implement the frequency modulation dynamic modeling method for the wind farm.

The electronic device and the computer-readable storage medium provided in the embodiments of the present invention have the same technical features, and can thus also solve the same technical problems and achieve the same technical effect.

In addition, in the description of the embodiments of the present invention, unless otherwise specified and limited, terms "installation", "connected" and "connection" should be understood in a broad sense, which, for example, can be fixedly connected, detachably connected, or integrally connected; can be mechanically connected or electrically connected; and can be directly connected, or indirectly connected through an intermediary, and be an internal communication of two components. For those of ordinary skill in the art, the specific meanings of the above terms in the present invention should be understood in specific situations.

In the description of the present invention, it should be noted that the indicated orientation or positional relationship of terms "center", "upper", "lower", "left", "right", "vertical", "horizontal", "inner", "outer" etc. is based on the orientation or positional relationship shown in the accompanying drawings, and is only for the convenience of describing the present invention and simplifying the description, rather than indicating or implying that the referred device or element must have a specific orientation, or in a specific orientation for construction and operation, and therefore should not be construed as limiting the present invention. In addition, terms "first", "second" and "third" are used for descriptive purposes only, and should not be construed as indicating or implying relative importance.

What is claimed is:

1. A frequency modulation dynamic modeling method for a wind farm, comprising:

acquiring first frequency modulation data measured at a grid-connected point of the wind farm under a plurality of preset working conditions;

calculating a state space matrix corresponding to the first frequency modulation data on the basis of a subspace identification method; and constructing a state space model corresponding to each of the plurality of working conditions according to the state space matrix; wherein the input of the state space model is the variation $\Delta f$ of the frequency value, corresponding to the first frequency modulation data, of the wind farm, and the output is the output power variation $\Delta P$ of the wind farm;

measuring the nonlinearity between the state space models corresponding to each two of the plurality of working conditions by using a gap measurement method;

combining the first frequency modulation data according to the nonlinearity to obtain second frequency modulation data;

constructing a regression vector according to a primary frequency modulation principle of wind power;

determining the delay order of the LSTM neural network on the basis of the following formula:

$$AIC = N * \log\left(\det\left(\frac{1}{N}\sum_1^N \varepsilon(t, \hat{\theta}_N)(\varepsilon(t, \hat{\theta}_N))^T\right)\right) + 2n_p + N * (n_y * (\log(2\pi) + 1))$$

where AIC represents a value of the Akaike information criterion, $\varepsilon(t)$ represents a preset prediction error vector, $\hat{\theta}_N$ represents a preset estimation parameter, N represents the number of sub-data in the second frequency modulation data, $n_p$ is the number of estimation parameters, and $n_y$ is the number of data output by the state space models;

according to the delay order, training the initial LSTM neural network by taking the regression vector as an input and the corresponding output power variation of the wind farm in the second frequency modulation data as an output, until a preset training requirement is met, and obtaining a trained frequency modulation dynamic model of the wind farm.

2. The frequency modulation dynamic modeling method for the wind farm according to claim 1, wherein the step of constructing a regression vector according to a primary frequency modulation principle of wind power comprises:

constructing the regression vector according to the following formula:

$y(t)=[\Delta f(t-1), \Delta f(t-2), \ldots, \Delta f(t-n_\alpha), \Delta P(t-1), \Delta P(t-2), \ldots, \Delta P(t-n_b)]$, where $n_\alpha$ and $n_b$ respectively represent the delay orders of the frequency modulation dynamic model of the wind farm, y(t) represents the regression vector equation, $\Delta f(t-1)$ represents the frequency deviation at time t−1 in the second frequency modulation data, $\Delta f(t-2)$ represents the frequency deviation at time t−2 in the second frequency modulation data, $\Delta f(t-n_\alpha)$ represents the frequency deviation at time $t-n_\alpha$ in the second frequency modulation data, $\Delta P(t-1)$ represents the power variation at time t−1 in the second frequency modulation data, $\Delta P(t-2)$ represents the power variation at time t−2 in the second frequency modulation data, and ΔP(t−n_b) represents the power variation at time t−n_b in the second frequency modulation data.

3. The frequency modulation dynamic modeling method for the wind farm according to claim 1, wherein the step of combining the first frequency modulation data according to the nonlinearity to obtain second frequency modulation data comprises:
dividing the plurality of working conditions into a plurality of working condition domains according to the nonlinearity; and
combining the first frequency modulation data corresponding to each working condition domain to obtain the second frequency modulation data.

4. The frequency modulation dynamic modeling method for the wind farm according to claim 1, wherein the step of acquiring first frequency modulation data of frequency modulation response characteristics of the wind farm under a plurality of preset working conditions comprises:
acquiring data measured at a grid-connected point of frequency modulation response characteristics of the wind farm under the plurality of preset working conditions; and
processing the data measured at the grid-connected point according to the preset conditions to obtain the first frequency modulation data.

5. An electronic device, comprising a processor and a memory, wherein the memory stores computer-executable instructions capable of being executed by the processor, and the processor executes the computer-executable instructions to implement the frequency modulation dynamic modeling method for the wind farm according to claim 1.

6. A frequency modulation dynamic modeling device for a wind farm, comprising:
a data acquisition module, configured to acquire first frequency modulation data measured at a grid-connected point of the wind farm under a plurality of preset working conditions;
a space model construction module, configured to construct a state space model corresponding to each of the plurality of working conditions according to the first frequency modulation data;
a nonlinearity determination module, configured to measure the nonlinearity between the state space models corresponding to each two of the plurality of working conditions by using a gap measurement method;
a working condition domain frequency modulation data determination module, configured to combine the first frequency modulation data according to the nonlinearity to obtain second frequency modulation data; and
a model training module, configured to
constructing a regression vector according to a primary frequency modulation principle of wind power;
determining the delay order of the LSTM neural network on the basis of the following formula:

$$AIC = N * \log\left(\det\left(\frac{1}{N}\sum_{1}^{N}\varepsilon(t, \hat{\theta}_N)(\varepsilon(t, \hat{\theta}_N))^T\right)\right) + 2n_p + N * (n_y * (\log(2\pi) + 1))$$

where AIC represents a value of the Akaike information criterion, ε(t) represents a preset prediction error vector, $\hat{\theta}_N$ represents a preset estimation parameter, N represents the number of sub-data in the second frequency modulation data, $n_p$ is the number of estimation parameters, and $n_y$ is the number of data output by the state space models;
according to the delay order, training the initial LSTM neural network by taking the regression vector as an input and the corresponding output power variation of the wind farm in the second frequency modulation data as an output, until a preset training requirement is met, and obtaining a trained frequency modulation dynamic model of the wind farm.

* * * * *